United States Patent
Dawson

(10) Patent No.: US 9,512,704 B2
(45) Date of Patent: Dec. 6, 2016

(54) METHODS OF PRODUCING HYDROCARBONS FROM A WELLBORE UTILIZING OPTIMIZED HIGH-PRESSURE WATER INJECTION

(71) Applicant: STATOIL GULF SERVICES LLC, Houston, TX (US)

(72) Inventor: Matthew A. Dawson, Houston, TX (US)

(73) Assignee: STATOIL GULF SERVICES LLC, Houston, TX (US)

(*) Notice: Subject to any disclaimer, the term of this patent is extended or adjusted under 35 U.S.C. 154(b) by 0 days.

(21) Appl. No.: 14/582,395

(22) Filed: Dec. 24, 2014

(65) Prior Publication Data

US 2016/0186547 A1   Jun. 30, 2016

(51) Int. Cl.
| | | |
|---|---|---|
| *E21B 43/26* | (2006.01) | |
| *E21B 43/20* | (2006.01) | |
| *C09K 8/584* | (2006.01) | |
| *C09K 8/62* | (2006.01) | |
| *E21B 43/16* | (2006.01) | |

(52) U.S. Cl.
CPC ............ *E21B 43/20* (2013.01); *C09K 8/584* (2013.01); *C09K 8/62* (2013.01); *E21B 43/16* (2013.01); *E21B 43/26* (2013.01)

(58) Field of Classification Search
CPC .................................. E21B 43/24; E21B 43/26
USPC ........................................................ 166/275
See application file for complete search history.

(56) References Cited

U.S. PATENT DOCUMENTS

| | | | | |
|---|---|---|---|---|
| 2009/0288825 A1* | 11/2009 | Tang | .................... | C09K 8/584 |
| | | | | 166/263 |
| 2010/0200239 A1* | 8/2010 | Aften | .................... | C09K 8/68 |
| | | | | 166/308.2 |

FOREIGN PATENT DOCUMENTS

| | | | |
|---|---|---|---|
| WO | WO 2012/058026 A1 | 5/2012 | |
| WO | WO 2014/158333 A1 | 10/2014 | |

OTHER PUBLICATIONS

International Search Report for Application No. PCT/EP2015/080507 dated Mar. 18, 2016.

* cited by examiner

*Primary Examiner* — Catherine Loikith
*Assistant Examiner* — Ryan Schneer
(74) *Attorney, Agent, or Firm* — Birch, Stewart, Kolasch & Birch, LLP

(57) ABSTRACT

A method of recovering hydrocarbons from a subterranean formation includes placing a wellbore in the formation, wherein the wellbore is approximately horizontal in the formation; forming one or more fractures in the formation in fluid communication with the wellbore; recovering hydrocarbons from the formation through the wellbore; injecting a volume of fluid comprising greater than 98 mass % water and greater than 0.005 mass % active surfactant into the formation through the wellbore, wherein at least 10 mass % of said volume is injected at a bottom hole pressure at the heel of the wellbore that is less than the minimum horizontal stress in at least a portion of the overburden and at least 5 mass % of said volume is injected at a bottom hole pressure at the heel of the wellbore that is greater than the median minimum horizontal stress in the subterranean formation; and subsequently recovering in situ hydrocarbons from the subterranean formation.

16 Claims, 5 Drawing Sheets

METHODS OF PRODUCING HYDROCARBONS FROM A WELLBORE UTILIZING OPTIMIZED HIGH-PRESSURE WATER INJECTION

BACKGROUND OF THE INVENTION

1. Field of the Invention

The present invention relates to methods of producing hydrocarbons from a wellbore by utilizing optimized high-pressure water injection. More specifically, the present invention relates to enhancing recovery of hydrocarbons from ultra-tight oil resources, also often known as unconventional or shale resources.

2. Description of Background Art

Over the years, enormous strides in various oil extraction and oil recovery (also referred to as "oil production") methods have been achieved, ranging from improved oil recovery ("IOR") methods, incorporating technologies such as water injection into subterranean oil-bearing formations, to enhanced oil recovery ("EOR") methods, incorporating technologies such as gas injection into subterranean oil-bearing formations.

The industry is also looking into recovering oil from geologic landscapes that formerly were economically challenged. For instance, ultra-tight permeability reservoirs often referred to as unconventional reservoirs or shale reservoirs. These reservoirs can contain hydrocarbons in the oil phase, gas phase, or both phases. The hydrocarbons in these reservoirs, however, may or may not actually be contained in true shales. In some cases, they are simply contained in very low permeability carbonates, siliciclastics, clays, or combinations thereof. A common attribute among this reservoir class is how they are typically developed. Many ultra-tight systems or shale reservoirs are economically developed using techniques such as horizontal wellbores and hydraulic fracturing to increase contact of the well with the formation The Bakken formation is one example of such an ultra-tight reservoir or subterranean hydrocarbon bearing formation.

Ultra-tight oil resources, such as the Bakken formation, have very low permeability compared to conventional resources. They are often stimulated using hydraulic fracturing techniques to enhance production and often employ ultra-long horizontal wellbores to commercialize the resource. However, even with these technological enhancements, these resources can be economically marginal and often only recover 5-15% of the original oil in place under primary depletion. Many of these resources can have variable wettability throughout the reservoir with much of the oil bearing rock having mixed- to oil-wet properties. This adverse wettability coupled with the ultra-tight pores and corresponding ultra-low permeability can make conventional water injection processes challenging. To date, there are no known successful water floods for very ultra-tight oil resources. In a sense, cyclic water injection has been carried out for many unconventional reservoirs to the degree that the hydraulic fracturing process utilizes water injected at high rate and pressure to mechanically break the subsurface formation. However, the chemical compositions, injection rates and durations, production strategy, and physical additives to the aqueous fracturing system are markedly different than what would be used in a cyclic water injection scheme aimed at enhancing oil recovery via traditional means.

In conventional oil fields, water injection to enhance recovery via more traditional mechanisms is one of the most commonly employed production enhancement techniques. Water injection provides voidage replacement and increases reservoir pressure, which assists in establishing the energy or driving force and creating the sweep needed for production of incremental oil that otherwise would not be produced. Over the past several decades, studies have been underway to optimize water injection in conventional reservoirs, examining additives such as alkali, surfactant, and polymer to improve sweep, reduce chemical adsorption, create favorable chemicals in situ, alter wettability, and establish more favorable interfacial tension and relative permeability characteristics. Much progress has been made in this technology area, but understanding the underlying mechanisms and optimizing the salinity, ions, pH, and chemical additives in an enhanced water injection scheme still remains a challenge.

To date, no successful waterflood or cyclic water injection methods for improving oil recovery have been successfully deployed in ultra-tight oil resources. This is due to the adverse wettability in the oil bearing pores (and even lack of understanding of where the oil resides, how it relates to mineralogy, and what mechanisms are at play which make these pores oil wet, in part due to the lack of techniques to investigate these fundamental physics at the pertinent scales (nanometer level) in ultra-tight systems). It is also due to the lack of injectivity in these ultra-tight pores where the median pore throat aperture can often be less than 50 nm. Technology is trending toward alternative water injection schemes that can overcome these challenges, but to date, no technology has been successfully developed. While traditional injection can often result in fracturing a formation after a long duration, this is often done unintentionally without care as to how rapidly it is done or for what duration or how effectively and efficiently it is done (i.e., how well fractures are generated and distributed along the length of the wellbore in the formation). These processes have all been traditionally done in vertical wells as well, which limit the need to effectively inject over a long distance (sometimes up to 2 miles) along the length of a horizontal wellbore. Methods of effectively distributing fluid along this length and inducing fractures along this length apart from the use of diverting agents has not been discussed.

As previously mentioned, hydraulic fracturing utilizes water and sand along with a suite of chemicals to mechanically fracture the subterranean formation. However, the injection rates, pressures, volumes, and durations as well as the chemical and physical constituents comprising the hydraulic fracturing fluids are targeted at breaking the subterranean formation, rather than penetrating into the formation, to act to replace void space, increase drive energy, alter wettability and relative permeability favorably and permanently. For example, in hydraulic fracturing processes, a high molecular weight polymer, typically polyacrylamide, is used as a "friction reducer" to reduce the effective drag on the hydraulic fracturing fluid as it is injected down the wellbore at high rates. These large molecular weight friction reducers, which can often have a molar mass of more than 10 million grams/mol, act to reduce the turbulence at the interface between the wellbore and the hydraulic fracturing fluid and thus reduce the overall friction losses. Friction reducers are used ubiquitously in hydraulic fracturing as they reduce the pumping horsepower required to fracture a reservoir, making it feasible to actually hydraulically fracture in some cases, while reducing the cost of the fracturing job. However, these large molecular weight polymers can actually have difficulty transporting through the ultra-tight pore throats in unconventional rock and plate out against the rock face, reducing the effective permeability of the matrix rock and impeding flow of the hydraulic fracturing fluid into the matrix. In addition, in many hydraulic fracturing jobs, gels are used, which further impede penetration into the matrix. Some lab tests have shown more than an order of magnitude reduction in the rate of penetration of hydraulic fracturing fluid into the matrix rock when including larger polymers in the hydraulic fracturing fluid.

Therefore, there is an industry-wide need for a method for recovering hydrocarbons from unconventional reservoirs, which maximize the recovery from these formerly challenged reservoirs.

SUMMARY OF THE INVENTION

The first embodiment of the present invention is directed to a method of recovering hydrocarbons from a subterranean formation, comprising the steps of placing a wellbore in the subterranean formation, wherein the wellbore is approximately horizontal in the subterranean formation; forming one or more fractures in the subterranean formation in fluid communication with the wellbore; recovering in situ hydrocarbons from the subterranean formation through the wellbore; injecting a volume of fluid comprising greater than 98 mass % water and greater than 0.005 mass % active surfactant into the subterranean formation through the wellbore, wherein at least 10 mass % of said volume is injected at a bottom hole pressure at the heel of the wellbore that is less than the minimum horizontal stress in at least a portion of the overburden and at least 5 mass % of said volume is injected at a bottom hole pressure at the heel of the wellbore that is greater than the median minimum horizontal stress in the subterranean formation; and subsequently recovering in situ hydrocarbons from the subterranean formation. At least a fraction of the injected fluid may be produced from the subterranean formation. The injecting step may be halted and at least a fraction of the injected fluid may be produced from the subterranean formation. The duration of the step of recovering in situ hydrocarbons may be greater than one month. The duration of time between the step of injecting and the step of subsequently recovering in situ hydrocarbons may be greater than two weeks. The fluid may exclude ultra-high molar weight polymers for at least 95 mass % of the injected volume. The fluid may exclude ultra-high molar weight polymers for at least 10 mass % of the injected volume. The ultra-high molar weight polymers may have a molar mass greater than 1 Million grams/mol or greater than 100,000 grams/mol. The fluid may comprise biocide, scale inhibitor, corrosion inhibitor, clay stabilizer, emulsion breaker, friction reducer, gel, diverting agent, or combinations thereof. The fluid may comprise methanol, D-Limonene, Naphtha, acetone, alcohol, toluene, ether, hydrocarbons, hydrochloric acid, fluoric acid, sodium hydroxide, sodium borate, or combinations thereof. The surfactant may comprise anionic surfactant, cationic surfactant, non-ionic surfactant, zwitterionic surfactant, or combinations thereof. The steps of recovering in situ hydrocarbons and injecting may occur in the same wellbore. The injected fluid may be injected into the subterranean formation from a first wellbore, and in situ hydrocarbons may be recovered from the subterranean formation from a second wellbore. The injected fluid may comprise produced fluid from the subterranean formation, surface water, water from an aquifer, treated water, or combinations thereof. The pH of the injected fluid may be between 5 and 8.5, preferably between 7 and 8. The total dissolved solids of the injected fluid may be between 500 ppm and 350,000 ppm, preferably between 5,000 ppm and 50,000 ppm. The injected fluid may comprise ions of sodium, magnesium, calcium, sulfur, hydrogen, hydroxide, barium, borate, sulfate, phosphate, or combinations thereof. The total dissolved solids of divalent ions in the fluid may be between 500 ppm and 20,000 ppm, preferably between 1,000 ppm and 10,000 ppm. The subterranean formation may have a matrix permeability of less than 1 mD, and the median pore throat diameter of the subterranean formation may be less than 500 nanometers. At least 10 mass %, preferably at least 25 mass %, of the volume injected may be injected at a bottom hole pressure at the heel of the wellbore that is less than minimum horizontal stress in at least a portion of the overburden. At least 5 mass %, preferably at least 25 mass %, of the volume injected may be injected at a bottom hole pressure at the heel of the wellbore that is less than the median minimum horizontal stress in the subterranean formation.

The second embodiment of the present invention is directed to a method of recovering hydrocarbons from a subterranean formation, comprising injecting a volume of fluid comprising greater than 98 mass % water and greater than 0.005 mass % active surfactant into the subterranean formation through a wellbore, wherein at least 10 mass % of said volume is injected at a bottom hole pressure at the heel of the wellbore that is less than the minimum horizontal stress in at least a portion of the overburden and at least 5 mass % of said volume is injected at a bottom hole pressure at the heel of the wellbore that is greater than the median minimum horizontal stress in the subterranean formation; and subsequently recovering in situ hydrocarbons from the subterranean formation, wherein the wellbore is approximately horizontal in the subterranean formation. At least a fraction of the injected fluid may be produced from the subterranean formation. The injecting step may be halted and at least a fraction of the injected fluid may be produced from the subterranean formation. The duration of time between the step of injecting and the step of subsequently recovering in situ hydrocarbons may be greater than two weeks. The fluid may exclude ultra-high molar weight polymers for at least 95 mass % of the injected volume. The fluid may exclude ultra-high molar weight polymers for at least 10 mass % of the injected volume. The ultra-high molar weight polymers may have a molar mass greater than 1 Million grams/mol or greater than 100,000 grams/mol. The fluid may comprise biocide, scale inhibitor, corrosion inhibitor, clay stabilizer, emulsion breaker, friction reducer, gel, or combinations thereof. The fluid may comprise methanol, D-Limonene, Naphtha, acetone, alcohol, toluene, ether, hydrocarbons, hydrochloric acid, fluoric acid, sodium hydroxide, sodium borate, or combinations thereof. The surfactant may comprise anionic surfactant, cationic surfactant, non-ionic surfactant, zwitterionic surfactant, or combinations thereof. The injected fluid may be injected into the subterranean formation from a first wellbore, and in situ hydrocarbons may be recovered from the subterranean formation from a second wellbore. The injected fluid may comprise produced fluid from the subterranean formation, surface water, water from an aquifer, treated water, or combinations thereof. The pH of the injected fluid may be between 5 and 8.5, preferably between 7 and 8. The total dissolved solids of the injected fluid may be between 500 ppm and 350,000 ppm, preferably between 5,000 ppm and 50,000 ppm. The injected fluid may comprise ions of sodium, magnesium, calcium, sulfur, hydrogen, hydroxide, barium, borate, sulfate, phosphate, or combinations thereof. The total dissolved solids of divalent ions in the fluid may be between 500 ppm and 20,000 ppm, preferably between 1,000 ppm and 10,000 ppm.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to one of ordinary skill in the art from this detailed description.

BRIEF DESCRIPTION OF THE DRAWINGS

The present invention will become more fully understood from the detailed description given below and the accompanying drawings that are given by way of illustration only and are thus not limitative of the present invention.

DETAILED DESCRIPTION OF THE INVENTION

Figure 1:
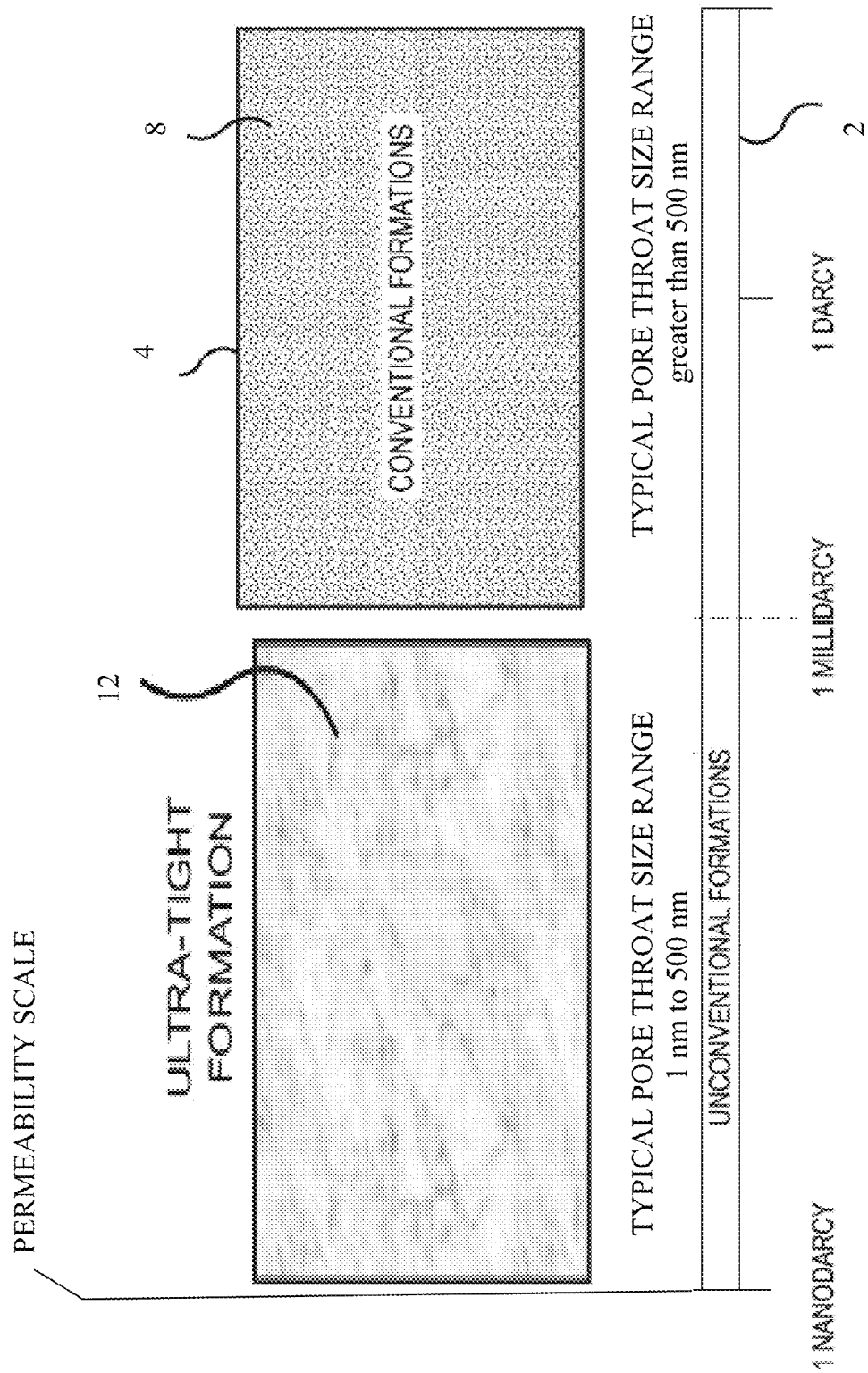
FIG. 1 is an illustration to explain tight to ultra-tight hydrocarbon-bearing subterranean formations.

The present invention will now be described with reference to the accompanying drawings.

The present invention is directed to methods of recovering hydrocarbons from a subterranean formation. More specifically, the present invention is directed to a method of operating an optimal water injection process to enhance oil recovery from a subterranean hydrocarbon bearing formation. Specific elements of the method, such as the steps to implement the method, the composition ranges of the optimal water injectant, and injection and production conditions are discussed below. The method involves injecting a substantial fraction of a fluid both above and below the minimum horizontal stress after fractures have been created and production has occurred.

The present invention substantially improves upon the recovery potential for chemical laden water injection beyond that of traditional hydraulic fracturing processes where the chemical system impedes fluid penetration. The present process is also a method of optimal water injection, which enhances injectivity by ensuring a portion of the injection occurs above minimum horizontal stress while ensuring good wellbore utilization and distribution of injected fluid by injecting a large portion of the fluid at a bottom hole pressure below the minimum horizontal stress. This process improves wellbore utilization and fluid distribution and enhances the potential for inducing more fractures along the length of the lateral when the pressure does exceed the minimum horizontal stress. The present invention also relates to a method of obtaining good injectivity and potentially inducing new fractures or stimulating old fractures while ensuring good wellbore utilization and injected fluid distribution.

The present invention also looks at a new application of chemical laden water injection in a reservoir class that previously has not been a target for chemical injection, and in particular, uses a series of steps including placing a horizontal wellbore and creating hydraulic fractures to enhance injectivity. The phrase "horizontal wellbore" is defined as a wellbore in which a portion of the length, preferably at least 50% of the length, of the wellbore contained within the subterranean formation is within 30 degrees of horizontal and preferably within 10 degrees of horizontal. Horizontal at any given location is defined as the plane orthogonal to the direction of the gravitational force exerted by earth on an object at that location.

Historically classical chemical injection schemes have looked at adding polymers to improve sweep efficiency. Conventional technologies have also looked at adding alkali to reduce adsorption of the surfactant and create in situ surfactants as well as reduce interfacial tension. Conventional technologies have also looked at surfactant injection, which traditionally aims to reduce interfacial tension substantially, often targeting ultra-low interfacial tension surfactants.

In contrast, due to favorable capillary pressures which can help assist imbibition, the present invention maintains a relatively high interfacial tension with the introduced surfactant. Wettability alteration has been known for surfactants and optimal water but is previously poorly understood, characterized, or controlled.

In this regard, a manner of identifying the potential success of oil recovery from subterranean formations is to characterize the permeability characteristics of the formation. Permeability is a measurement of the resistance to fluid flow of a particular fluid through the reservoir and is dependent on the structure, connectivity, and material properties of the pores in a subterranean formation. Permeability can differ in different directions and in different regions.

Figure 2:
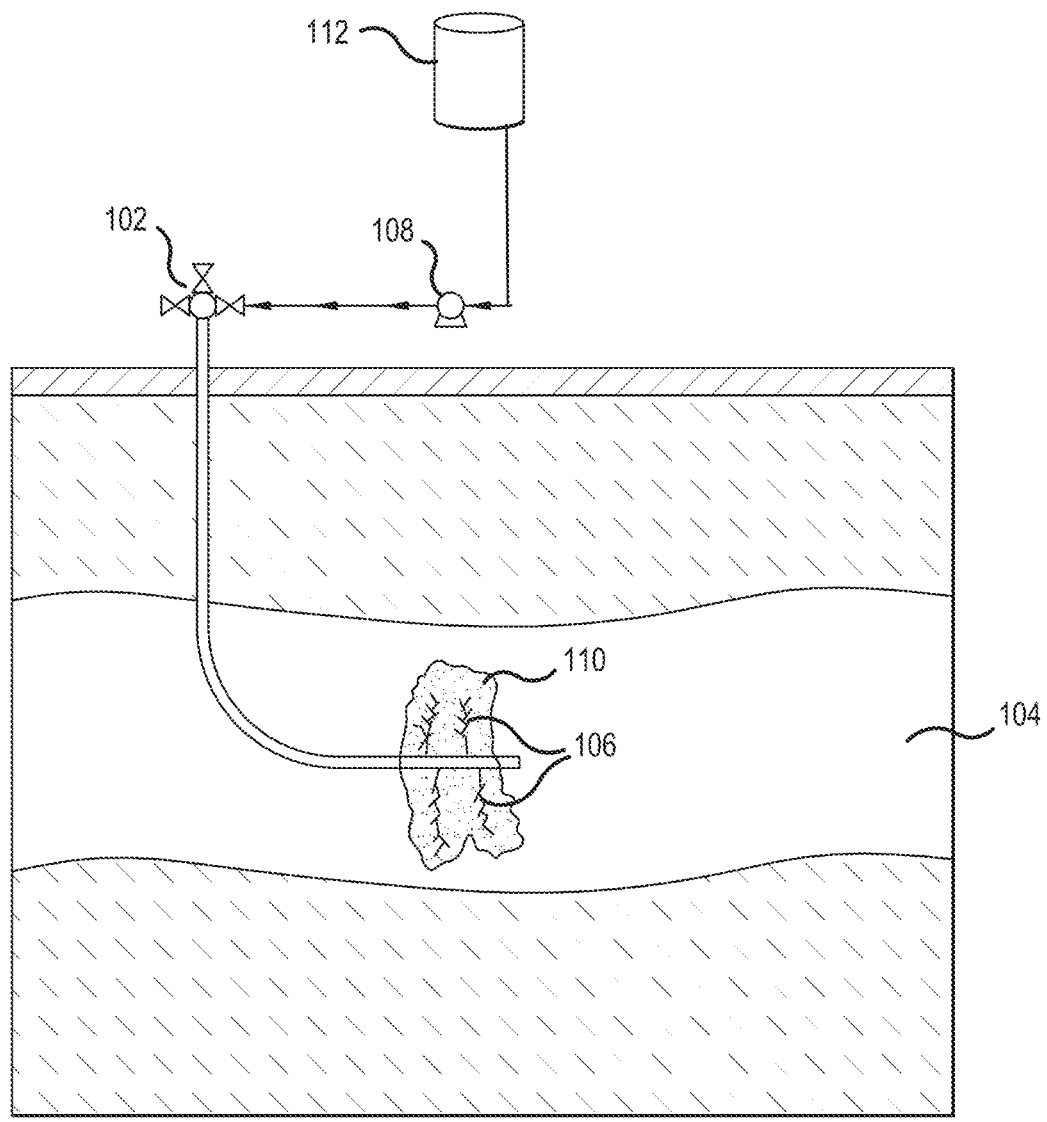
FIG. 2 is a diagrammatic view of an example of a hydrocarbon-bearing subterranean formation to which the present invention is applicable.

FIG. 1 is an example of an ultra-tight hydrocarbon-bearing subterranean formation 104 as depicted in FIG. 2. An ultra-tight formation is characterized in terms of permeability or permeability scale 2. In a conventional formation 4, the pore throat sizes are relatively large (i.e., greater than 500 nm) such that, when the pores are highly interconnected 8, the formation is conducive to the flow of hydrocarbons. A conventional formation 4 will have a relatively high permeability as compared to ultra-tight formations 12. Ultra-tight formations are also known as unconventional formations, which have a typical pore throat size of 1 to 500 nm.

Permeability can be defined using Darcy's law and can often carry units of $m^2$, Darcy (D), or milliDarcys (mD).

Some reservoirs have regions of ultra-tight permeability, where the local permeability may be less than 1 μD, while the overall average permeability for the reservoir may be between 1 μD and 1 mD. Some reservoirs may have regions of ultra-tight or tight permeability with typical permeability of less than 1 mD in a majority of the formation but regions of the formation with high permeability greater than 1 mD and even greater than 1 D, particularly in the case of reservoirs with natural fractures. In other words, permeability can vary within a formation. As such, in the present invention, the formation may be better defined in terms of median pore throat diameter.

In the present invention, a hydrocarbon-bearing subterranean formation with a matrix permeability of less than a stated value means a formation with at least 90% of the formation having an unstimulated well test permeability below that stated value. However, at least 95%, at least 97%, at least 98%, or at least 99% of the formation may have an unstimulated well test permeability below that stated value. The present invention is applicable to hydrocarbon-bearing subterranean formations having a matrix permeability of less than 1 mD, but the formation may have a matrix permeability of less than 0.1 mD or less than 1 μD.

In addition, the present invention can be applied to reservoirs where both stimulated surface area and near-wellbore conductivity is required for optimum production enhancement.

Fracturing techniques may be used to provide a means to increase the injectivity of a formation when the reservoir has low permeability characteristics. Fracturing techniques may also be used as a means of injecting fluid when the reservoir has low permeability characteristics.

The term "fracturing" refers to the process and methods of breaking down a hydrocarbon-bearing subterranean formation and creating a fracture (i.e., the rock formation around a wellbore) by pumping fluid at very high pressures in order to increase production rates from a hydrocarbon-bearing subterranean formation. The fracturing methods use conventional techniques known in the art.

The present methods increase the ability to extract hydrocarbons after other methods of recovery are performed on a reservoir.

One embodiment of the present invention is directed to a method of recovering hydrocarbons from a subterranean formation. FIG. 2 is an example of a hydrocarbon recovery system comprising a wellbore 102 connected to the subterranean formation 104, an injection apparatus 108 connected to the wellbore, and at least storage container 112 in fluid communication with the injection apparatus 108. The storage container 112 may be a storage tank or a truck. In this embodiment, a wellbore 102 may be drilled in a hydrocarbon-bearing subterranean formation 104 with a matrix permeability of greater than 1 mD, less than 1 mD, less than 0.1 mD, or less than 1 µD. In the alternative, the subterranean formation 104 may be defined by its median pore throat diameter wherein the subterranean formation has a median pore throat diameter of greater than 500 nm, less than 500 nm, greater than 50 nm, less than 50 nm, or greater than 10 µm. For example, the median pore diameter may be 1 nm to 500 nm. In another embodiment, an existing wellbore 102 can be utilized in a method for restimulating a hydrocarbon-bearing subterranean formation 104 with a matrix permeability of greater than 1 mD, less than 1 mD, less than 0.1 mD, or less than 1 µD. In the alternative, the subterranean formation 104 may be defined by its median pore throat diameter wherein the subterranean formation has a median pore throat diameter of greater than 500 nm, less than 500 nm, greater than 50 nm, less than 50 nm, or greater than 10 µm. The wellbore 102 can be a single wellbore, operational as both an injection and production wellbore, or alternatively, the wellbore can be distinct injection and production wellbores. The wellbore 102 may be conventional or directionally drilled, thereby reaching the formation 104, as is well known to one of ordinary skill in the art. The wellbore 102 is approximately horizontal in the formation.

The subterranean formation 104 can be stimulated in order to create fractures 106 in the subterranean formation 104. Then, hydrocarbons are recovered from an influence zone 110 in the subterranean formation through a wellbore. This step may take greater than one month, preferably greater than three months, more preferably greater than six months.

Next, a volume of fluid comprising greater than 98 mass % water and greater than 0.005 mass % active surfactant is injected into the subterranean formation through the wellbore. The content of active surfactant is preferably 0.05 mass % or greater, more preferably 0.1 mass % or greater. The fluid is contained in the storage container 112. The fluid is injected into the formation 104 by way of a wellbore. At least 10 mass % (preferably at least 20 mass %) of the volume of fluid is injected at a bottom hole pressure at the heel of the wellbore 102 that is less than the minimum horizontal stress in at least a portion of the overburden and at least 5 mass % (preferably at least 10 mass %) of said volume is injected at a bottom hole pressure at the heel of the wellbore 102 that is greater than the median minimum horizontal stress in the subterranean formation. The phrase "bottom hole pressure" means the pressure in the wellbore. The phrase "heel of the wellbore" means the beginning of the horizontal section of the wellbore. In other words, the heel of the wellbore is the location where the wellbore first penetrates into the subterranean formation as one travels from the wellhead in the wellbore toward the formation. Alternatively, the heel of the wellbore could be defined as the closest perforation to the wellhead as one moves along the wellbore in the subterranean formation or the perforation with the smallest measured depth. In contrast, the toe of the wellbore would be the end of the horizontal section of the wellbore. Principal stresses are components of the stress tensor when the basis is changed in such a way that the shear stress components are zero. In other words, at every point in a stressed body there are at least three orthogonal planes, called the principal planes, with normal vectors called principal directions where the corresponding stress vector is perpendicular to the plane (i.e., parallel to the normal vector) and where there are no shear stress components on the planes. The three stresses normal to these principal planes are called principal stresses. Principal stresses are well understood and common to one of ordinary skill in the art. The minimum horizontal stress, as defined herein, is the smallest of the three principal stresses. It does not have to be exactly horizontal but will typically be near horizontal. A minimum horizontal stress exits at every point in a stressed rock, formation, or overburden. Therefore, the phrase "median minimum horizontal stress in the formation" means a representative minimum horizontal stress in the subterranean formation. The minimum horizontal stress in at least a portion of the overburden is used since the minimum horizontal stress can decrease dramatically with reduced overburden depth. The minimum horizontal stress in at least a portion of the overburden may be the maximum or largest minimum horizontal stress in the overburden.

Figure 3:
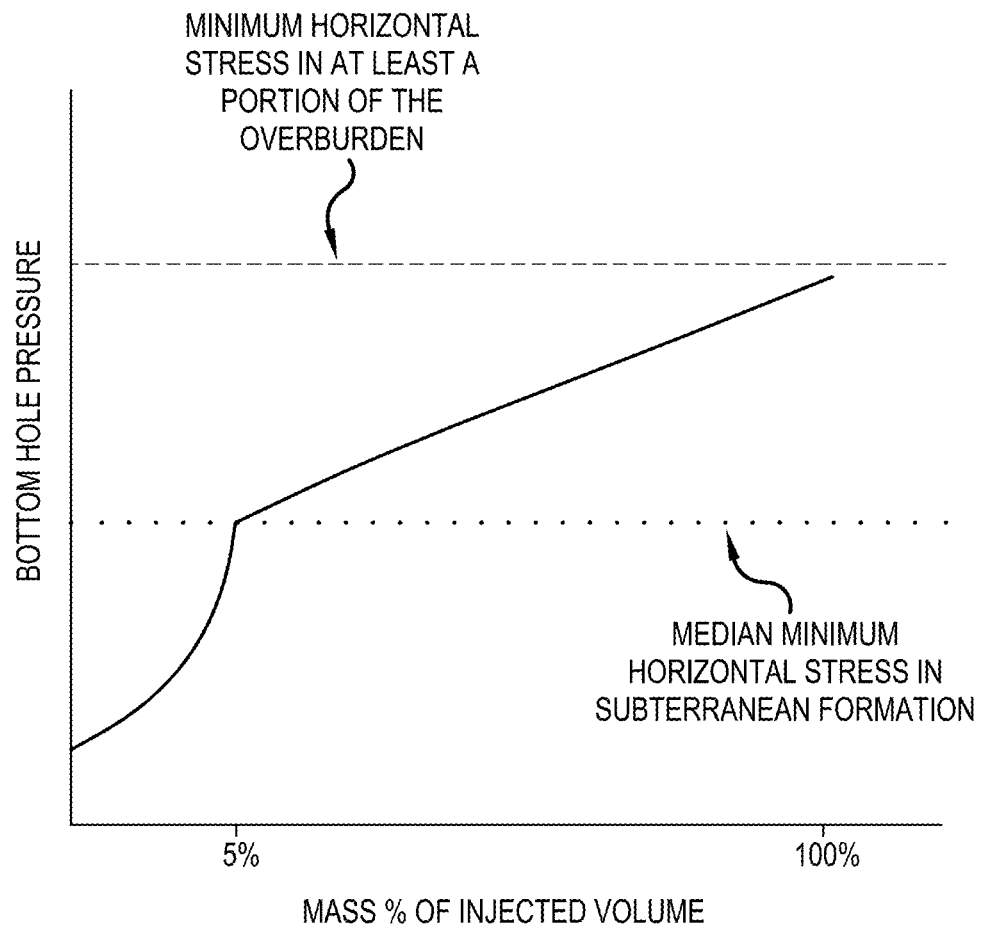
FIGS. 3-5 show sample images of cumulative fluid injected versus pressure.
Figure 4:
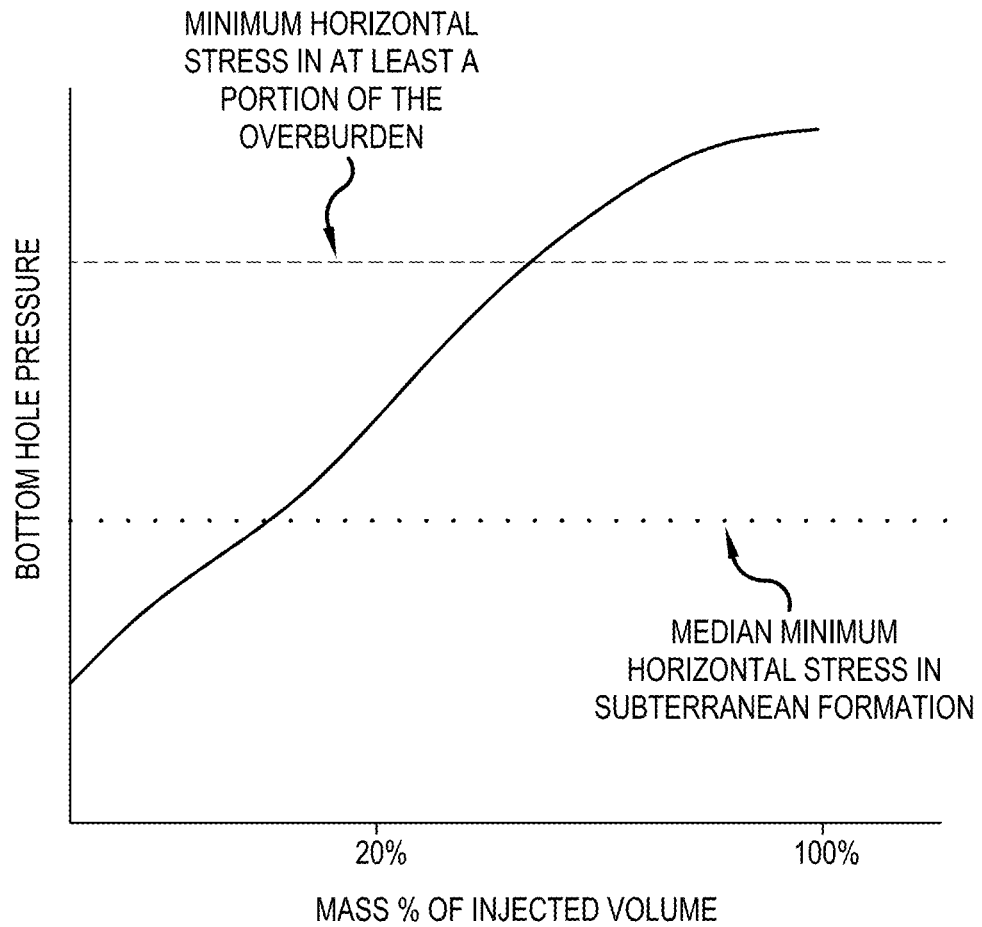
Figure 5:
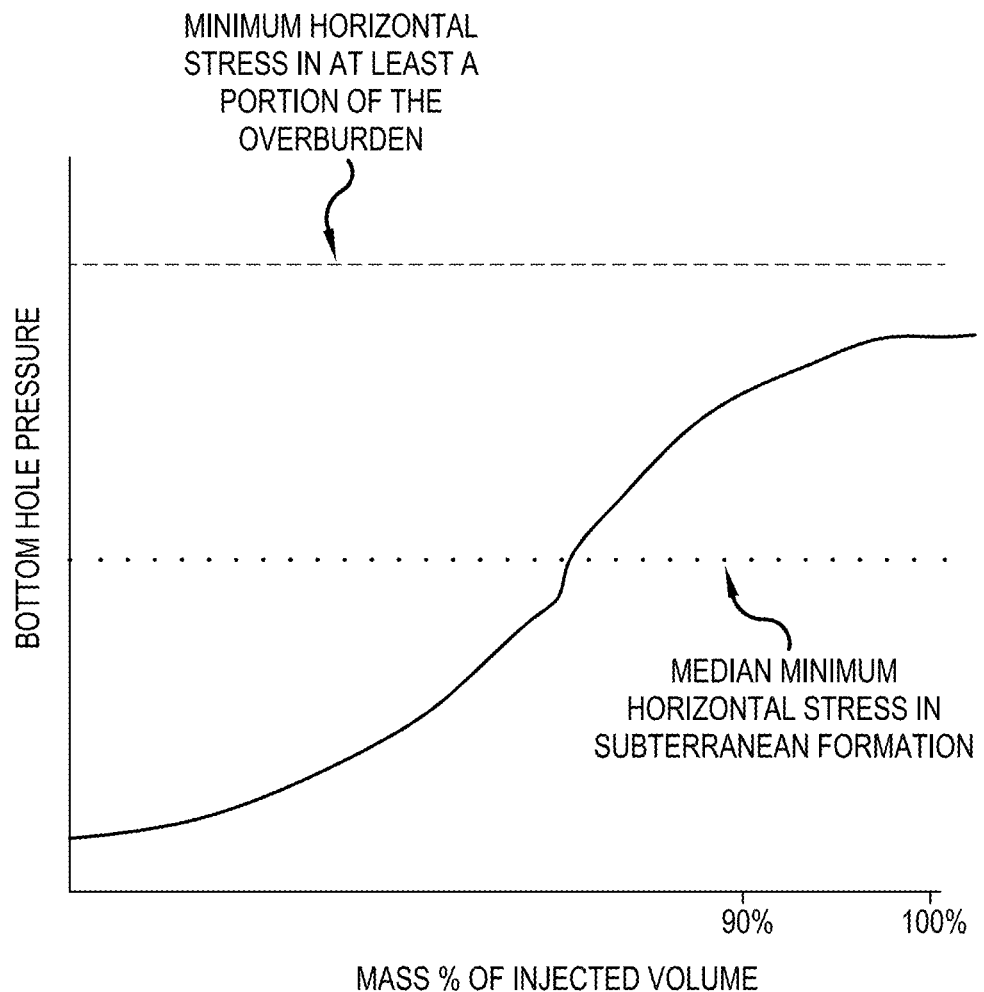

FIGS. 3-5 show different types of bottom hole pressure profiles at the heel of the well as a volume of fluid is injected into the subterranean formation through the wellbore in accordance with the method disclosed herein. The dashed line shows the minimum horizontal stress in at least a portion of the overburden. The dotted line shows the median minimum horizontal stress in the subterranean formation. In FIG. 3, the injected volume of fluid starts at a minimum pressure below the median minimum horizontal stress in the subterranean formation. Then, as the amount of injected volume reaches about 5 mass %, the injection pressure is about the same as the median minimum horizontal stress in the subterranean formation. Then, the injection pressure slowly increases to below the minimum horizontal stress in at least a portion of the overburden until the injected volume reaches 100 mass %. In FIG. 4, the injected volume of fluid starts at a minimum pressure below the median minimum horizontal stress in the subterranean formation. Then, as the amount of injected volume is slightly under 20 mass %, the injection pressure is about the same as the median minimum horizontal stress in the subterranean formation. Then, the injection pressure slowly increases above the minimum horizontal stress in at least a portion of the overburden until the injected volume reaches 100 mass %. In FIG. 5, the injected volume of fluid starts at a minimum pressure below the median minimum horizontal stress in the subterranean formation. Then, as the amount of injected volume increases, the injection pressure also continues to increase but remains below the minimum horizontal stress in at least a portion of the overburden until the injected volume reaches 100 mass %. As shown in the figures, the injection pressure profile of the present invention can have many different configurations, and the present invention should not be limited by the profiles illustrated in the figures.

Once the fluid is injected into the formation, the wellbore can be shut in for a period of time. The time may be less than four hours but may extend beyond several weeks. Preferably, the time is greater than two weeks.

Then, in situ hydrocarbons are subsequently recovered from the subterranean formation.

The phrase "in situ hydrocarbons" is defined as hydrocarbons residing in the subterranean formation prior to placing the wellbore in the subterranean formation.

In the present method, at least a fraction of the injected fluid may be produced from the subterranean formation. Further, the injection may be halted, and at least a fraction of the injected fluid may be produced from the subterranean formation.

The fluid may exclude ultra-high molar weight polymers for at least 10 mass % of the injected volume; preferably at least 95 mass % of the injected volume. The ultra-high molar weight polymers have a molar mass greater than 1 million grams/mol. However, the ultra-high molar weight polymers may also be considered polymers having a molar mass greater than 10,000 grams/mol or greater than 100,000 grams/mol.

In addition to water and active surfactant, the fluid may comprise biocide, scale inhibitor, corrosion inhibitor, clay stabilizer, emulsion breaker, friction reducer, gel, or combinations thereof. For example, the clay stabilizer may be salts such as choline chloride or sodium chloride. The biocide may be bis sulafate or glutaraldehyde. The scale inhibitor may be ethylene glycol or methanol. The emulsion breaker may be surfactants or low molecular weight polymers. The friction reducer may be high molecular weight polymers such as polyacrylymide. The corrosion inhibitor may be a mixture of a polymer and a surfactant. The fluid may also comprise methanol, D-Limonene, Naphtha, acetone, alcohol, toluene, ether, hydrocarbons, hydrochloric acid, fluoric acid, sodium hydroxide, sodium borate, or combinations thereof.

As noted above, the fluid comprises greater than 0.005 mass % active surfactant. The active surfactant in the fluid may comprise anionic surfactant, cationic surfactant, nonionic surfactant, zwitterionic surfactant, or combinations thereof. The surfactants that can be used would be known to one of ordinary skill in the art. For example, the surfactants may be ethoxylated surfactants, such as alkylphenol ethoxylates or ethoxylated alcohols, alpha-olefin sulfonates, internal olefin sulfonates, or benzenesulfonate.

The injected fluid may comprise produced fluid from the subterranean formation, surface water, water from an aquifer, treated water, or combinations thereof.

The pH of the injected fluid may be between 5 and 8.5, preferably between 7 and 8.

The total dissolved solids of the injected fluid may be between 500 ppm and 350,000 ppm, preferably between 5,000 ppm and 50,000 ppm.

The injected fluid may comprise ions of sodium, magnesium, calcium, sulfur, hydrogen, hydroxide, barium, borate, sulfate, phosphate, or combinations thereof.

The total dissolved solids of divalent ions in the fluid may be between 500 ppm and 20,000 ppm, preferably between 1,000 ppm and 10,000 ppm.

Subterranean formations are located between overburden and underburden, which largely act as seals or flow inhibitors/barriers. Conventional fracturing processes sometimes go through the overburden and/or the underburden as well as the subterranean formation. The present process may not dilate existing fractures in the overburden or underburden and may not induce new fractures in the overburden and underburden, thus creating longer, more effective fractures in the formation while minimizing fluid waste and maximizing cost efficiency. The subterranean formation can, among other things, contain siliciclastics and carbonate rocks, clay, minerals, hydrocarbons, and organic material within the formation materials thereof. The formation materials included in the present technology are those found in geologic formations such as tight reservoirs. Such formation materials include, but are not limited to, formations of rock and shale, which include hydrocarbons interspersed amongst the inorganic components.

As discussed above, one method of the present invention includes injecting a fluid into a hydrocarbon-bearing subterranean formation. In one embodiment, the fluid is injected through a wellbore into a subterranean formation containing hydrocarbons, the fluid is allowed to reside for a period of time in the subterranean formation, and in situ hydrocarbons are subsequently recovered from the subterranean formation.

The fluid can be left to reside in the subterranean formation, for instance, for at least three hours before additional fluid is added, further pumping begins, or the fluid is recovered. In additional embodiments, the fluid is allowed to reside for one to three days, two to three weeks, or one to two months. The amount of time that the fluid resides in the subterranean formation will depend on a number of factors such as the size of the formation, the type of formation, the initial fluid distribution, the petrophysical characteristics of the formation, the applied drawdown, and the wellbore configuration. However, the amount of time is preferably greater than two weeks.

The injection process may be cyclic or continuous. If cyclic, cycles which include both the injection and production durations may last one week. In additional embodiments, cycles, which include both the injection and production durations may last one to two months or one to two years.

The injection of the fluid and subsequent recovery of in situ hydrocarbons may be in the same wellbore or different wellbores.

The porosity of the reservoir is involved in determining the volume of liquid needed, location of the wellbores, and recognition of the effects obtainable with the present method. The term porosity refers to the percentage of pore volume compared to the total bulk volume of a rock. A high porosity means that the rock can contain more hydrocarbons per volume unit. The saturation levels of oil, gas, and water refer to the percentage of the pore volume that is occupied by oil or gas. An oil saturation level of 20% means that 20% of the pore volume is occupied by oil, while the rest is gas or water.

During oil extraction, the pore content may change due to production or other parameters affecting the reservoir. In the present method, the fluid is injected into a subterranean formation and resides in the pore space for a period of time to release oil from the pore spaces.

The injection pressure for injecting the fluids of the present invention is preferably above the initial reservoir pressure for at least a portion of the injection but is not required to be above the initial reservoir pressure for the entire injection period.

The present invention achieves several advantages over conventional technologies. First, the present invention is directed to low-cost optimal water injection for enhancing hydrocarbon recovery beyond primary depletion. The present invention increases the potential for recovery from 5-15% to upwards of 20% for ultra-tight oil systems in a cost effective, low-risk, and easy to implement fashion that is superior in health, safety, and environmental performance. The present invention also enables the reuse of produced water, reducing environmental concerns associated with waste water trucking and disposal offsite. The present invention is also more cost effective than primary production due to high drilling and completing costs for unconventional resources, which could cause a paradigm shift in this resource class.

Second, the present invention is directed to a way to effectively deliver a wettability altering chemical, which targets the optimal wettability alteration mechanisms, to the matrix of an ultra-tight oil system. This process enables a shift in the relative permeability and capillary pressures to enhance water imbibition and oil recovery, enabling economically viable secondary recovery in ultra-tight, mixed- to oil-wet systems.

Third, the present invention is directed to a method of enhancing injectivity in this recovery process and improving recovery by opening up existing or creating new hydraulic fractures during the injection process. The present invention also better distributes fluid along a long horizontal wellbore without the use of diverting agents which can impede flux into the matrix. The present invention also maximizes the potential to induce or open up fractures along the entire length of the wellbore as the pressure along the wellbore and throughout the formation is allowed to equilibrate and rise more uniformly and gradually until a substantial fraction of the reservoir along the wellbore is near the minimum horizontal stress, at which point exceeding the minimum horizontal stress has potential to induce more fractures along the wellbore length than it would in a more traditional process, which injects more rapidly from the onset at higher pressure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of recovering hydrocarbons from a subterranean formation, comprising the steps of:
    placing a wellbore in the subterranean formation, wherein the wellbore is approximately horizontal in the subterranean formation;
    forming one or more fractures in the subterranean formation in fluid communication with the wellbore;
    recovering in situ hydrocarbons from the subterranean formation through the wellbore;
    injecting a volume of fluid comprising greater than 98 mass % water and greater than 0.005 mass % active surfactant into the subterranean formation through the wellbore, wherein at least 10 mass % of said volume is injected at a bottom hole pressure at the heel of the wellbore that is less than the minimum horizontal stress in at least a portion of the overburden and at least 5 mass % of said volume is injected at a bottom hole pressure at the heel of the wellbore that is greater than the median minimum horizontal stress in the subterranean formation; and
    subsequently recovering in situ hydrocarbons from the subterranean formation;
    wherein the fluid further comprises biocide, corrosion inhibitor, clay stabilizer, emulsion breaker, friction reducer, gel, diverting agent, or combinations thereof, and
    wherein at least a fraction of the injected fluid is produced from the subterranean formation.

2. The method of claim 1, wherein the injecting step is halted and at least a fraction of the injected fluid is produced from the subterranean formation.

3. The method of claim 1, wherein the fluid excludes ultra-high molar weight polymers for at least 95 mass % of the injected volume; wherein ultra-high molar weight polymers have a molar mass greater than 100,000 grams/mol.

4. The method of claim 1, wherein the fluid excludes ultra-high molar weight polymers for at least 10 mass % of the injected volume; wherein ultra-high molar weight polymers have a molar mass greater than 100,000 grams/mol.

5. The method of claim 1, wherein the fluid comprises methanol, D-Limonene, Naphtha, acetone, alcohol, toluene, ether, hydrocarbons, hydrochloric acid, fluoric acid, sodium hydroxide, sodium borate, or combinations thereof.

6. The method of claim 1, wherein the surfactant comprises anionic surfactant, cationic surfactant, non-ionic surfactant, zwitterionic surfactant, or combinations thereof.

7. The method of claim 1, wherein the steps of recovering in situ hydrocarbons and injecting occur in the same wellbore.

8. The method of claim 1, wherein the injected fluid is injected into the subterranean formation from a first wellbore and in situ hydrocarbons are recovered from the subterranean formation from a second wellbore.

9. The method of claim 1, wherein the injected fluid comprises produced fluid from the subterranean formation, surface water, water from an aquifer, treated water, or combinations thereof.

10. The method of claim 1, wherein the injected fluid comprises ions of sodium, magnesium, calcium, sulfur, hydrogen, hydroxide, barium, borate, sulfate, phosphate, or combinations thereof.

11. The method of claim 1, wherein the subterranean formation has a matrix permeability of less than 1 mD.

12. The method of claim 1, wherein the median pore throat diameter of the subterranean formation is less than 500 nanometers.

13. The method of claim 1, wherein at least 25 mass % of said volume injected is injected at a bottom hole pressure at the heel of the wellbore that is less than minimum horizontal stress in at least a portion of the overburden.

14. The method of claim 1, wherein at least 5 mass % of said volume injected is injected at a bottom hole pressure at the heel of the wellbore that is less than median minimum horizontal stress in the subterranean formation.

15. The method of claim 1, wherein at least 25 mass % of said volume injected is injected at a bottom hole pressure at the heel of the wellbore that is less than median minimum horizontal stress in the subterranean formation.

16. A method of recovering hydrocarbons from a subterranean formation, comprising the steps of:
    injecting a volume of fluid comprising greater than 98 mass % water and greater than 0.005 mass % active surfactant into the subterranean formation through a wellbore, wherein at least 10 mass % of said volume is injected at a bottom hole pressure at the heel of the wellbore that is less than the minimum horizontal stress in at least a portion of the overburden and at least 5 mass % of said volume is injected at a bottom hole pressure at the heel of the wellbore that is greater than the median minimum horizontal stress in the subterranean formation; and subsequently recovering in situ hydrocarbons from the subterranean formation;

wherein the wellbore is approximately horizontal in the subterranean formation;

wherein the fluid further comprises biocide, corrosion inhibitor, clay stabilizer, emulsion breaker, friction reducer, gel, diverting agent, or combinations thereof, and wherein at least a fraction of the injected fluid is produced from the subterranean formation.

* * * * *